(12) United States Patent
Creed

(10) Patent No.: US 12,333,293 B2
(45) Date of Patent: Jun. 17, 2025

(54) ONLINE UPDATE COMPATIBILITY VERIFICATION PRIOR TO UPDATE IMPLEMENTATION

(71) Applicant: Dell Products, L.P., Hopkinton, MA (US)

(72) Inventor: John Creed, Innishannon (IE)

(73) Assignee: Dell Products, L.P., Hopkinton, MA (US)

( * ) Notice: Subject to any disclaimer, the term of this patent is extended or adjusted under 35 U.S.C. 154(b) by 144 days.

(21) Appl. No.: 18/181,612

(22) Filed: Mar. 10, 2023

(65) Prior Publication Data

US 2024/0303061 A1      Sep. 12, 2024

(51) Int. Cl.
| G06F 9/445 | (2018.01) |
| G06F 8/65  | (2018.01) |
| G06F 8/71  | (2018.01) |
| H04L 12/24 | (2006.01) |

(52) U.S. Cl.
CPC . *G06F 8/65* (2013.01); *G06F 8/71* (2013.01)

(58) Field of Classification Search
CPC .................................... G06F 8/65; G06F 8/71
See application file for complete search history.

(56) References Cited

U.S. PATENT DOCUMENTS

| 9,921,827 B1* | 3/2018 | Evans ................. G06F 9/44536 |
| 10,263,844 B1* | 4/2019 | Wu ......................... G06F 8/654 |
| 11,126,385 B1* | 9/2021 | Zakharov ............. G06F 3/1229 |
| 2015/0074657 A1* | 3/2015 | Bhat ......................... G06F 8/65 |
| | | 717/170 |
| 2015/0331641 A1* | 11/2015 | Michishita .............. G06F 3/121 |
| | | 358/1.13 |
| 2016/0094502 A1* | 3/2016 | Pollack ............... H04L 12/6418 |
| | | 726/4 |

(Continued)

FOREIGN PATENT DOCUMENTS

CN        114371857 A    *  4/2022    .......... G06F 11/3006

OTHER PUBLICATIONS

English version of PDF of Moyal et al. CN-114371857-A, Digital Twinning Enabled Asset Performance And Upgrade Management (Year: 2022).*

*Primary Examiner* — S. Sough
*Assistant Examiner* — Mohammad H Kabir
(74) *Attorney, Agent, or Firm* — Anderson Gorecki LLP

(57) ABSTRACT

An online system for update compatibility verification is provided, that enables the compatibility of a proposed update to be verified against a current storage system configuration prior to be implemented on the storage system. Updates, in this context, include hardware updates, firmware updates, software updates, and combinations of updates. In connection with initiating implementation of an update on a storage system, the current storage system configuration information is used by the update compatibility verification system to determine whether the update has been identified as having caused errors or performance degradations in other similarly configured storage systems, and hence is not compatible with the storage system based on the current storage system configuration. In instances where the update compatibility verification system determines that the update is not compatible with the current storage system configuration, the update is prohibited from being applied to the storage system.

11 Claims, 6 Drawing Sheets

(56) References Cited

U.S. PATENT DOCUMENTS

| | | | |
|---|---|---|---|
| 2020/0229206 A1* | 7/2020 | Badic | H04W 52/0209 |
| 2023/0177043 A1* | 6/2023 | Jenuwine | G06F 16/258 |
| | | | 707/609 |
| 2024/0192951 A1* | 6/2024 | Kruempelmann | G06F 8/71 |
| 2024/0231991 A1* | 7/2024 | Palanisamy | G06F 11/0787 |

* cited by examiner

FIG. 4

| | Update Compatibility Databank 265 | | | | | | |
|---|---|---|---|---|---|---|---|
| Update 1 | | Incompatible Storage System Configurations | | | | | |
| | #1 | Storage system type | Hardware Information | Firmware Information | Current Software Information | | |
| | ... | ... | ... | ... | ... | | |
| | #N | Any | Hardware component #2 | Firmware version #3.1.1 | Any | | |
| Update 2 | | Incompatible Storage System Configurations | | | | | |
| | #1 | Storage system type | Hardware Information | Firmware Information | Current Software Information | | |
| | ... | ... | ... | ... | ... | | |
| | #M | Storage system type | Hardware Information | Firmware Information | Current Software Information | | |
| ... | | | | | | | |
| Update Z | | Incompatible Storage System Configurations | | | | | |

ONLINE UPDATE COMPATIBILITY
VERIFICATION PRIOR TO UPDATE
IMPLEMENTATION

FIELD

This disclosure relates to computing systems and related devices and methods, and, more particularly, to a method and apparatus for online update compatibility verification prior to update implementation based on current storage system configuration information.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, an online system for update compatibility verification is provided, that enables the compatibility of a proposed update to be verified against a current storage system configuration prior to be implemented on the storage system. Updates, in this context, include hardware updates, firmware updates, software updates, and combinations of updates. In connection with initiating implementation of an update on a storage system, the current storage system configuration information is used by the update compatibility verification system to determine whether the intended update has been identified as having caused errors or performance degradations in other similarly configured storage systems, and hence is not compatible with the storage system based on the current storage system configuration. In instances where the update compatibility verification system determines that the update is not compatible with the current storage system configuration, the update is prohibited from being applied to the storage system. Optionally, remedial and preventative steps may be recommended to change the current storage system configuration to make the storage system configuration compatible with the update. By preventing application of updates to storage systems having configurations that are similar to other storage systems where the update was identified as being incompatible, it is possible to reduce the number of update failures.

In some embodiments, a method of update compatibility verification prior to update implementation, includes starting an update script configured to control application of an update to operational systems of a storage system, collecting storage system configuration information from the storage system, and communicating the storage system configuration information to an update compatibility verification system. The method also includes using the storage system configuration information by the update compatibility verification system to determine if the update is compatible with the storage system configuration, and responding to the update script with a compatibility verification determination specifying that the update is compatible with the storage system configuration or that the update is not compatible with the storage system configuration. In response to a determination that the update is compatible with the storage system configuration, applying the update by the update script to the operational systems of the storage system. In response to a determination that the update is not compatible with the storage system configuration preventing, by the update script, the update from being applied to the operational systems of the storage system.

In some embodiments, the update to the operational systems of the storage systems includes a hardware update, a firmware update, a software update, or a combination of hardware, firmware, and software updates.

In some embodiments, the storage system configuration information includes a storage system type information, storage system hardware information, storage system firmware information, and storage system software information. In some embodiments, the storage system hardware information identifies the hardware components of the storage system. In some embodiments, the storage system firmware information identifies a firmware version that is currently installed on each of the hardware components that require the use of firmware. In some embodiments, the storage system software information identifies current software that has been installed on the storage system, as well as patches and bug fixes that have been applied to the storage system.

In some embodiments, communicating the storage system configuration information to an update compatibility verification system includes querying the update compatibility verification system for the compatibility verification determination.

In some embodiments, the method further includes maintaining an update compatibility databank, by the update compatibility verification system. In some embodiments, the update compatibility databank includes entries correlating updates with known incompatible storage system configurations. In some embodiments, the update compatibility databank includes entries correlating respective storage system configurations and updates that are known to be incompatible with the respective storage system configurations.

In some embodiments, the update compatibility verification system is a centralized online system.

In some embodiments, in response to a determination that the update is not compatible with the storage system configuration, the method further includes identifying preparatory actions to be implemented on the storage system to change the configuration of the storage system such that the update will be compatible with the changed configuration of the storage system.

In some embodiments, in response to a determination that the update is compatible with the storage system configuration, the method further includes determining a result of applying the update by the update script to the operational systems of the storage system. In some embodiments, in response to a determination that the result was a failure, the method includes generating a rule to be applied by the update compatibility verification system identifying the update as being not compatible with the storage system configuration.

In some embodiments, determining the result of applying the update is implemented contemporaneously with applying the update to the storage system. In some embodiments, determining the result of applying the update is implemented over a subsequent time interval after applying the update to the storage system. In some embodiments, determining the result of applying the update includes determining an increased number of storage system failures during the subsequent time interval after applying the update to the storage system. In some embodiments, determining the result of applying the update includes determining an increased number of dial-home service requests by the storage system during the subsequent time interval after applying the update to the storage system. In some embodiments, determining the result of applying the update includes determining a degraded performance by the storage system during the subsequent time interval after applying the update to the storage system.

BRIEF DESCRIPTION OF THE DRAWINGS

FIG. 4 is a block diagram of another example update compatibility databank for use with the online system for update compatibility verification prior to update implementation, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
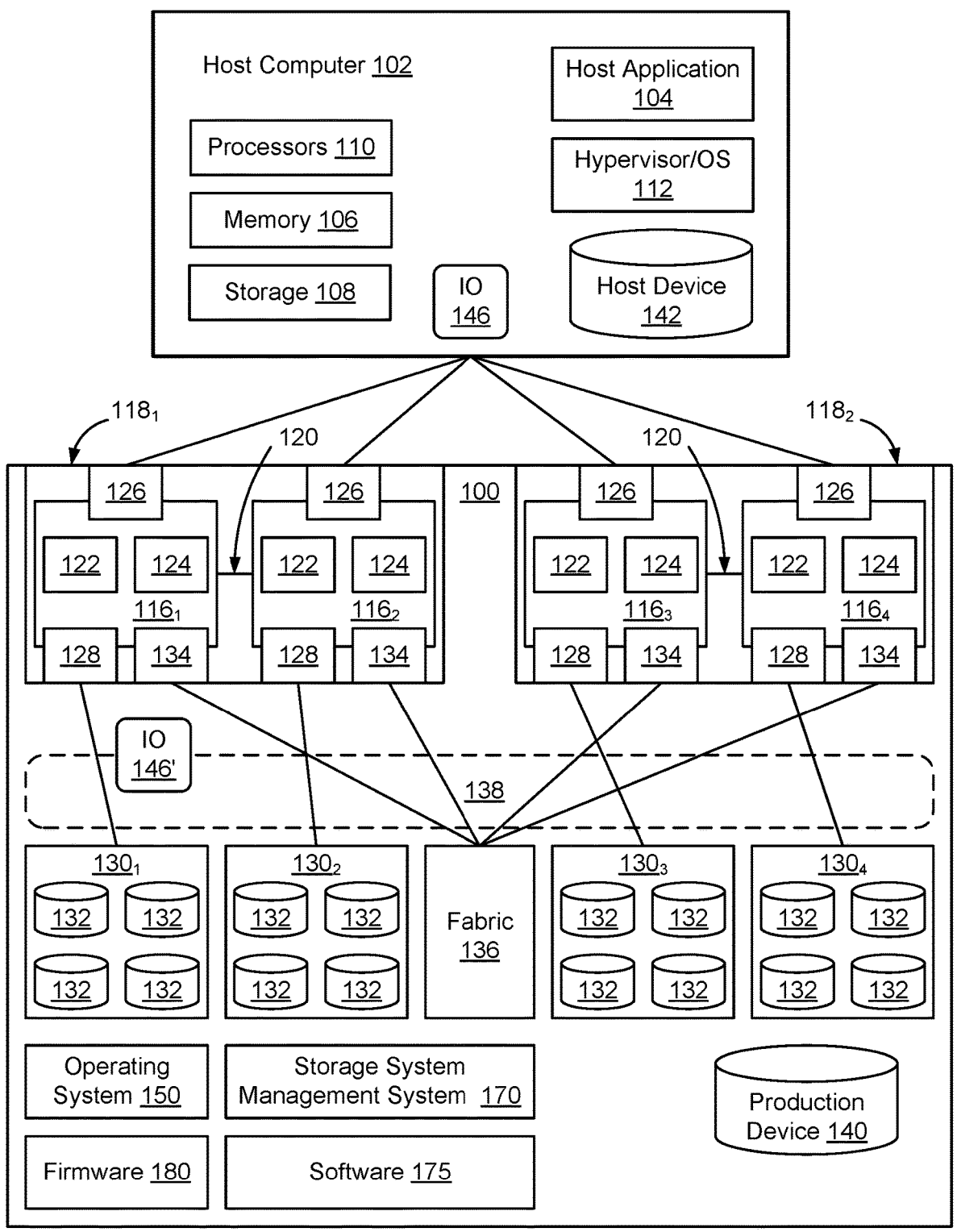
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

As is clear from FIG. 1, storage systems 100 are complex computer implemented systems with multiple hardware components and multiple software systems 175 that execute together to enable the storage system to function as planned. In addition, many of the hardware components have firmware 180 that is used to configure operation of the hardware components. Further, many of the components of the storage system and the manner of operation of the software may be user-configurable, for example via storage system management system 170, which may change the manner in which the storage system operates.

Software 175 is often changed, for example to fix known errors or vulnerabilities, to add new functionality, or for various other reasons. Similarly, the firmware is often changed, for example to update the functionality of particular hardware components or to fix known issues. Likewise, the hardware components can be changed, for example when scheduled to prevent failure, after failure, or when new hardware components are desired to be deployed that have different or better performance characteristics. Accordingly, there are many instances where one or more updates may need to be applied to a storage system. As used herein, the term "update" when used alone, is used as a generic term to refer to a hardware update, a firmware update, a software update, or a combination of hardware, firmware and/or software updates.

Whenever a change is made to the storage system 100, such as a change to the software 170, a change to the firmware 180, or a change to one or more of the hardware components, it is possible that the update might be incompatible with the current storage system configuration. For example, a hardware or firmware update may cause the hardware components to be inoperable with the existing software version, a software update may be incompatible with existing hardware or firmware, etc. There are many scenarios in which particular systems might not be entirely compatible, or when making a selected modification will result in a storage system that is not able to operate as intended. Likewise, the storage system itself might be dynamically configured such that, although a particular software/firmware/hardware update would normally be acceptable, the dynamic configuration of the storage system can result in the update causing errors or a degradation in performance.

In some embodiments, an online system for update compatibility verification is provided, that enables the compatibility of a proposed update to be verified against a current storage system configuration prior to be implemented on the storage system. Updates, in this context, include hardware updates, firmware updates, software updates, and combinations of updates. In connection with initiating implementation of an update on a storage system, the current storage system configuration information is used by the update compatibility verification system to determine whether the update has been identified as having caused errors or performance degradations in other similarly configured storage systems, and hence is not compatible with the storage system based on the current storage system configuration. In instances where the update compatibility verification system determines that the update is not compatible with the current storage system configuration, the update is prohibited from being applied to the storage system. Optionally, remedial and preventative steps may be recommended to change the current storage system configuration to make the storage system configuration compatible with the update. By preventing application of updates to storage systems having configurations that are similar to other storage systems where the update was identified as being incompatible, it is possible to reduce the number of update failures.

Figure 2:
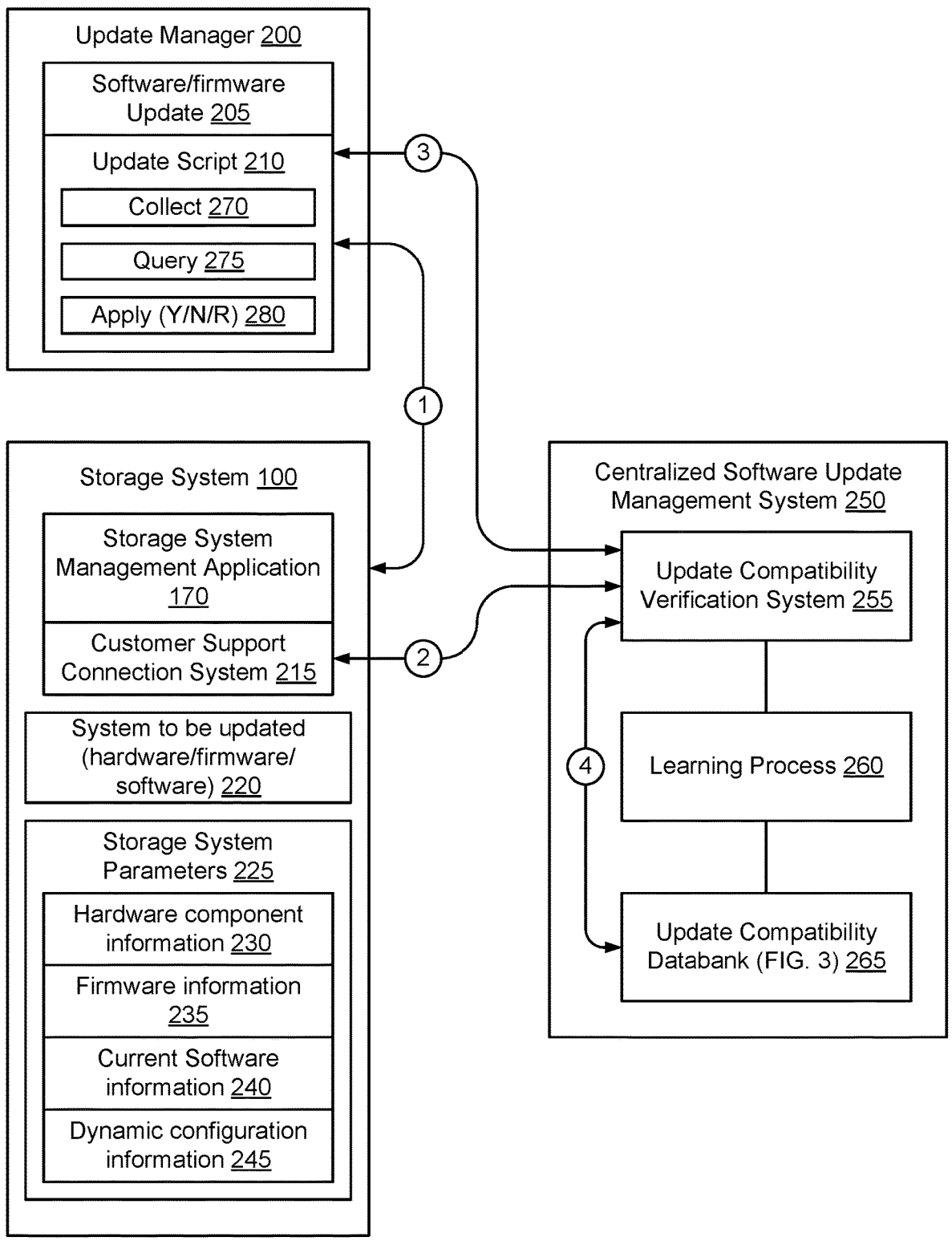
FIG. 2 is a functional block diagram an example online system for update compatibility verification prior to update implementation, according to some embodiments.

FIG. 2 is a functional block diagram an example online system for update compatibility verification prior to update implementation, according to some embodiments. As shown in FIG. 2, in some embodiments a storage system is updated by physically interacting with the storage system in its deployed location, for example by plugging a laptop computer into a communication port of the storage system and locally (in the field) performing an update operation on the storage system. For example, if one or more of the hardware components of the storage system are to be physically replaced, it is often necessary to physically remove one or more previous components and then physically install one or more new components. Similarly, some software updates and firmware updates are required to be implemented in the field, by having a person locally implement the software or firmware update while locally interacting with the storage system.

Accordingly, as shown in FIG. 2, in some embodiments an update manager 200 that contains an update 205 is provided, for example on a laptop or tablet computer, that is locally connected to a storage system 100. The update 205 includes one or more update scripts 210 that specifies a series of operations to be executed to manage installation of the update 205 on the storage system 100. During installation of the update 205, the update script 210 will execute to manage the process of installing the update 205 on the storage system 100. In some embodiments, the update script is used for software updates, firmware updates, and hardware updates. Accordingly, although some embodiments will be described in which the update script is used in connection with a software/firmware modification operation, it should be understood that the update script 210 may similarly be used in connection with other modifications of the operational capabilities of the storage system, including hardware updates.

As shown in FIG. 2, in some embodiments the storage system 100 includes a customer support connection system 215. Some storage system manufacturers provide on-line customer support and, if an error occurs on the storage system, a dial-home message may be generated and transmitted to the on-line customer support. In some embodiments, the customer support connection system 215 is implemented as part of the dial-home system; in other embodiments, the customer support connection system 215 is implemented separately from the storage system's dial-home system. Although FIG. 2 shows the support connect system 215 implemented as part of the storage system 100, in some embodiments the functionality of the customer support connection system 215 can instead be implemented by update manager 200.

As shown in FIG. 2, in some embodiments the update script 210 includes collect script 270 to collect information about the current storage system configuration, including information regarding the hardware, firmware, software, and dynamic configuration of the storage system 100. The update script 210 also includes query script 275 to cause the collected current storage system configuration information to be provided to an update compatibility verification system 255 to query if an intended update 205 is compatible with the current storage system configuration information. The update script also includes an apply script 280 that selectively applies the update to the storage system in dependence on the response from the update compatibility verification system 255. In some embodiments, depending on the response from the update compatibility verification system 255, the apply script 280 applies the update (Y), does not apply the update (N), or implements remedial (preparatory) actions (R), prior to applying the update 205. Remedial actions, as that term is used herein, refer to preparatory steps taken in advance of application of the update to the storage system, that enable the configuration of the storage system to be changed such that the storage system is deemed to not be incompatible with the proposed update before the update is implemented. "Remedial actions" are also synonymously referred to herein as preparatory actions.

In some embodiments, the collect script 270 is implemented to cause an application on the storage system, such as the storage system management application 170, to determine a set of hardware components, firmware components, and software packages that are currently in use on the storage system 100 (arrow 1). As discussed in greater detail below, the collect script may be run in advance of application of the update 205, for example prior to initiation of the update. Alternatively, the collect script 270 may be run as part of the update 205.

In some embodiments, the storage system 100 includes a set of storage system parameters 225 that describe configuration of the storage system 100. Example storage system parameters 225 include hardware component information 230, firmware information 235, current software information 240, and current dynamic configuration information 245. Each of these aspects may have multiple pieces of information. For example, as noted above, a given storage system 100 may have multiple storage engines 118, each storage engine 118 may have multiple compute nodes 116, and each compute node 116 has multiple electrical components, such as front-end adapters 126, back-end adapters 128, processors 122, memory 124, etc. The hardware component information 230 may describe all of these hardware component or only some of the hardware components, depending on the implementation.

Similarly, the firmware information 235 may include information about the firmware version implemented on each of the hardware components. The firmware information 235, in some embodiments, identifies the firmware version that is currently installed on each of the hardware components that require the use of firmware. Knowing which firmware version is implemented on a particular hardware component can affect whether a particular software update or firmware update will operate correctly on the storage system.

The current software information 240, in some embodiments, describes the current software that has been installed on the storage system, as well as patches and bug fixes that have been applied to the storage system. In some instances, where two or more software processes are required to interact, a particular software update to one piece of software might be determined to be incompatible with a particular version of another piece of software, or incompatible with a version of another piece of software that has or has not been updated using a particular patch or bug fix. By determining the current versions of the software that are installed on the storage system, it is possible for the update compatibility verification system 255 to look for these types of incompatibilities when performing update compatibility verification prior to update implementation.

The storage system dynamic information 245 describes aspects of the storage system that are administratively set on the storage system, for example by a person through an interface to the storage system management system 170. In particular situations, dynamic settings of the storage system may be determined to be incompatible with a particular update. In instances where the settings are able to be changed, preventative actions may be provided in response to the query, which may include identifying changes to the settings that should be implemented prior to applying the update to the storage system.

The collected hardware information 230, firmware information 235, software information 240, and dynamic configuration information 245, is provided to the update compatibility verification system 255. In some embodiments, where the storage system 100 includes a customer support connection system 215, the query script 275 is executed by the customer support connection system 215 to cause the information collected by the collect script 270 to be transmitted to the update compatibility verification system 255 (arrow 2). In some embodiments, the information collected in response to the collect script 270 is returned to the update manager 200 (arrow 1), and the update manager executes the query script 275 to cause the information that is collected by the collect script 270 to be transmitted to the update compatibility verification system 255 (arrow 3). In some embodiments, the query script 275 submits the collected information to the update compatibility verification system 255 to verify that the intended update is compatible with the current storage system configuration.

In some embodiments, the update compatibility verification system 255 is implemented as part of a centralized software update management system 250, although the update compatibility verification system 255 may also be implemented as a stand-alone system depending on the implementation. In response to receipt of the information that was collected by the collect script 270 (arrow 2 or arrow 3), the update compatibility verification system 255 performs a query on an update compatibility databank 265. A databank, as that term is used herein, is used to refer to a repository of information, such as a database, that is organized to facilitate local or remote information retrieval. Several example update compatibility databanks 265 are shown in FIGS. 3 and 4, and are discussed in greater detail below.

In some embodiments, the update compatibility verification system 255 determines, from the databank query (arrow 4) whether the update 205 is compatible with the current storage system configuration. The result of the databank query is returned to the update manager 200 either directly (arrow 3) or via the customer support connection system 215 (arrow 2 and arrow 1), and the result from the update compatibility verification system 255 is used by the apply script 280 to selectively either apply the update 205 to the storage system (Y), not apply the update 205 to the storage system (N), or to apply one or more remedial (preparatory) actions (R) to the storage system prior to applying the update 205.

Figure 3:
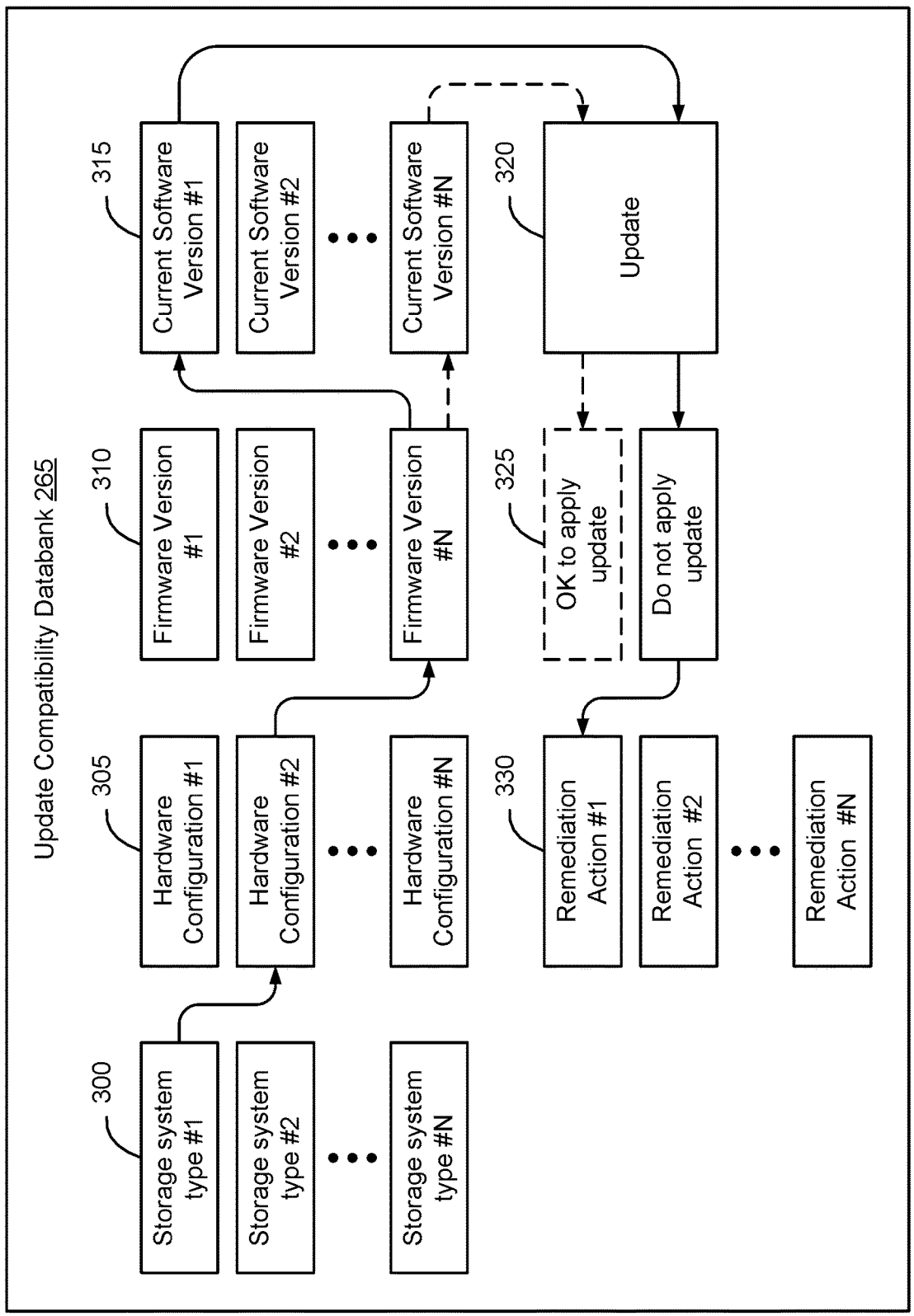
FIG. 3 is a block diagram of an example update compatibility databank for use with the online system for update compatibility verification prior to update implementation, according to some embodiments.

FIG. 3 is a block diagram of an example update compatibility databank 265 for use with the online system for update compatibility verification prior to update implementation, according to some embodiments. As shown in FIG. 3, in some embodiments the update compatibility databank 265 includes information identifying aspects of storage systems that is able to be used to identify storage systems that have been determined to be incompatible with particular updates. As noted above, an update might be a hardware update, a firmware update, a software update, or a combination of various types of updates. As used herein, the term "update" when used alone, is used as a generic term to refer to a hardware update, a firmware update, a software update, or a combination of various types of updates.

In some embodiments, the update compatibility databank 265 includes information about multiple types of storage systems 300, hardware configurations 305, firmware configurations 310, and software configurations 315. Based on a combination of factors such as the type of storage system 300, hardware configuration 305, firmware version 310, software version 315, and an identification of the update 320 to be applied, the update compatibility databank 265 includes an indication as to whether the update has been determined to be incompatible 325.

In some embodiments, the update compatibility databank 265 includes information 300, 305, 310, 315 only about particular storage system configurations that are known to be incompatible with particular updates 320. In some embodiments, update compatibility databank 265 includes information both about storage system configurations that are known to be compatible with particular updates 320, as well as information about storage system configurations that are known to be incompatible with particular updates. For example, the arrows in FIG. 3, show a hypothetical storage system configuration, in which the storage system is of type #1, has hardware configuration #2, and has firmware version #N. In instances where the current software is version #1, given the proposed update 320, the update compatibility databank 265 contains a compatibility indication 325 "Do not apply update". By contrast, in instances where the current software is version #N, given the proposed update 320, the update compatibility databank 265 contains a compatibility indication 325 "OK to apply update".

Depending on the implementation, in instances where the update compatibility databank 265 does not contain a compatibility indication for a particular combination of storage system configuration and update identification, the default compatibility indication 325 returned by the update compatibility databank 265 is that the intended update is not known to be incompatible with the particular storage system configuration. In response to a default compatibility determination, in some embodiments the update script 210 continues to apply the update to the storage system 100.

In some embodiments, in instances where the update compatibility databank 265 contains a compatibility indication 325 that indicates that the update is not compatible with the particular storage system configuration, the update compatibility databank 265 may optionally include a set of one or more remedial (preparatory) actions 330 that should be taken on the storage system to change the storage system configuration to enable the update 320 to be applied. In the example shown in FIG. 3, for example, since the update is not compatible with a storage system having the given hardware/firmware configuration when the current version of the software is version #1, but the update is compatible for a storage system having the same hardware/firmware configuration when the current version of the software is version #N, remediation action #1 might be to update the current software version from version #1 to version #N prior to applying the update 320.

FIG. 4 is a block diagram of another example update compatibility databank 265 for use with the online system for update compatibility verification prior to update implementation, according to some embodiments. As shown in FIG. 4, in some embodiments the update compatibility databank 265 is organized according to update identification number, and a list of known incompatible storage configurations are included for each update.

The list of known incompatible storage configurations may include full configuration information for each entry, or may contain partial configuration information for some or all of the entries. For example, if a particular update is known to be incompatible with any storage system that has a particular firmware version for a particular hardware component, the incompatible storage system configuration may include an entry in which the storage system type is a wildcard, the hardware information identifies the particular hardware component, the firmware information identifies the particular firmware version, and the software information is a wildcard. This scenario is shown in FIG. 4, in which update 1 includes as one of the incompatible storage system configurations, an entry #N, in which any storage system type, running any software, is known to be incompatible with update #1 if the storage system includes hardware component #2 and firmware version 3.1.1.

There are many ways of organizing information in the update compatibility databank 265, and the examples provided in FIGS. 3 and 4 are merely intended to show two possible implementations. As such, it should be understood that many types of databases and other data structures may be used to organize data to enable correlations between storage system type, hardware, firmware, software, dynamic configuration information, and proposed updates, to enable updates to be identified that are incompatible with particular storage system configurations.

Figure 5:
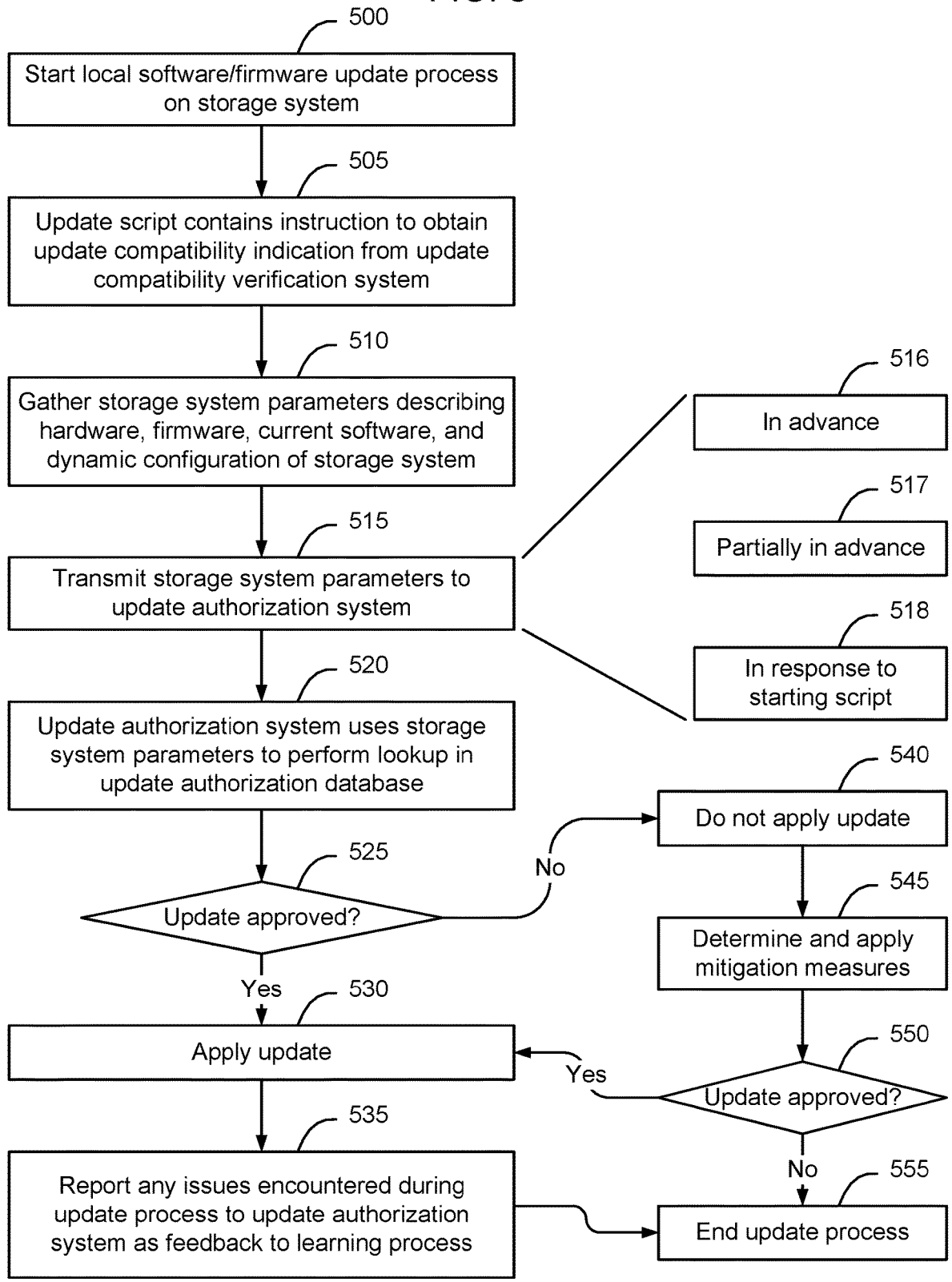
FIG. 5 is flowchart of an example method of utilizing an online system for update compatibility verification prior to update implementation to selectively enable application of an update to a storage system having a particular storage system configuration, according to some embodiments.

FIG. 5 is flowchart of an example method of utilizing an online system for update compatibility verification prior to update implementation, to selectively enable application of an update to a storage system having a particular storage system configuration, according to some embodiments. As shown in FIG. 5, when an update is started on a storage system (block 500), the update script 210 contains instructions to obtain an update compatibility verification 325 from an on-line centralized update compatibility verification system 255 (block 505). In some embodiments, the update compatibility indication 325 is an indication that the update has not been determined to be incompatible with storage systems having the particular characteristics of the storage system where the update will be applied.

As shown in FIG. 5, storage system configuration information is gathered describing the storage system type, the hardware installed in the storage system, the firmware versions in use on the storage system, the types of software installed on the storage system, the particular versions of the software, and dynamic configuration parameters of the storage system (block 510). The collected configuration information describing the storage system is transmitted to the update compatibility verification system 255 (block 515) to enable the update compatibility verification system 255 to perform a lookup in the update compatibility databank 265 (block 520) to determine if the update is known to not be compatible with storage systems having this particular storage system configuration (block 525).

As shown in FIG. 5, in some embodiments the configuration information describing the storage system might be somewhat extensive. Accordingly, the timing of transmitting the storage system configuration information to the update compatibility verification system 255 in block 515 may be implemented in different ways, depending on the particular implementation. For example, as shown in FIG. 5, in some embodiments some or all of the storage system parameters 225 describing the storage system may be provided to the update compatibility verification system 255 in advance (block 516) or partially in advance (block 517). For example, a given storage system 100 might have a relatively static configuration, such that the hardware, firmware, and software does not change daily. When an update is planned to be applied to the storage system, the script 210 can cause the storage system parameters 225 to be collected and transmitted to the update compatibility verification system 255 in advance, e.g., a week prior to the update, a day prior to the update, or hours prior to the update. Then, when the update is to be applied, the information describing the storage system configuration will already have been collected and transmitted to the update compatibility verification system 255. This enables only changes to the storage system configuration to be transmitted in real-time to the update compatibility verification system 255, thus reducing the amount of time required to implement the update compatibility verification.

Additionally, in embodiments where some or all of the storage system configuration information is transmitted to the update compatibility verification system 255 in advance, it is possible for the update compatibility verification system 255 to evaluate the update against the storage system configuration prior to starting the update process. If the intended update is identified as being incompatible with the particular storage system, any identified remedial (preparatory) actions can then be applied to the storage system before the update occurs.

In instances where the storage system parameters 225 are provided to the update compatibility verification system 255 in advance (block 516) or partially in advance (block 517), in some embodiments when the update is started on the storage system, the storage system implements a check to determine if any of the storage system parameters 225 have changed since they were previously communicated to the update compatibility verification system 255. If any changes have occurred, the new storage system parameters 225 are transmitted to the update compatibility verification system 255. Various ways of comparing current storage system parameters 225 with the previously communicated storage system parameters 225 may be implemented depending on the implementation.

Although in some embodiments some or all of the storage system configuration information is transmitted before starting the update, in some embodiments the storage system parameters 225 are collected and transmitted as part of the update process, for example in response to starting the update script 210, and are not done in advance (block 518).

As noted above, after receiving the storage system configuration information, the update compatibility verification system 255 performs a query in the update compatibility databank 265 to determine if the update is compatible with a storage system having the given storage system configuration (block 520). In response to a determination that the update is not known to be incompatible with the current storage system configuration (a determination of YES at block 525), the update is applied to the storage system (block 530). Optionally, any issues encountered during the update process may be reported back to the update compatibility verification system 255 as feedback (block 535). For example, if the update fails or if the storage system otherwise has trouble accepting the update or encounters other errors in connection with application of the update to the storage system, this type of information may be communicated back to the update compatibility verification system 255. Additional details associated with collecting and reporting update success/failure are provided in connection with FIG. 6. Once the feedback has been collected, the process ends (block 555). Optionally, when the update process ends with failure, a rule may be created and added to the update compatibility databank 265.

In response to a determination that the update is known to be incompatible with storage systems having the current storage system configuration (a determination of NO at block 525), the update is not applied to the storage system (block 540). In some embodiments, the update compatibility verification system 255 will determine a set of remediation measures (preparatory actions) that should be applied to the storage system before application of the update (block 545). Once the remediation measures have been applied to the storage system, a subsequent query is made to the update compatibility verification system 255 to determine if the update is compatible with the newly configured/remediated storage system (block 550). In response to a determination that the update is compatible with the new storage system configuration (a determination of YES at block 550), the update is applied (block 530). In response to a determination that the update is not compatible with the new storage system configuration (a determination of NO at block 550), the update process ends.

Figure 6:
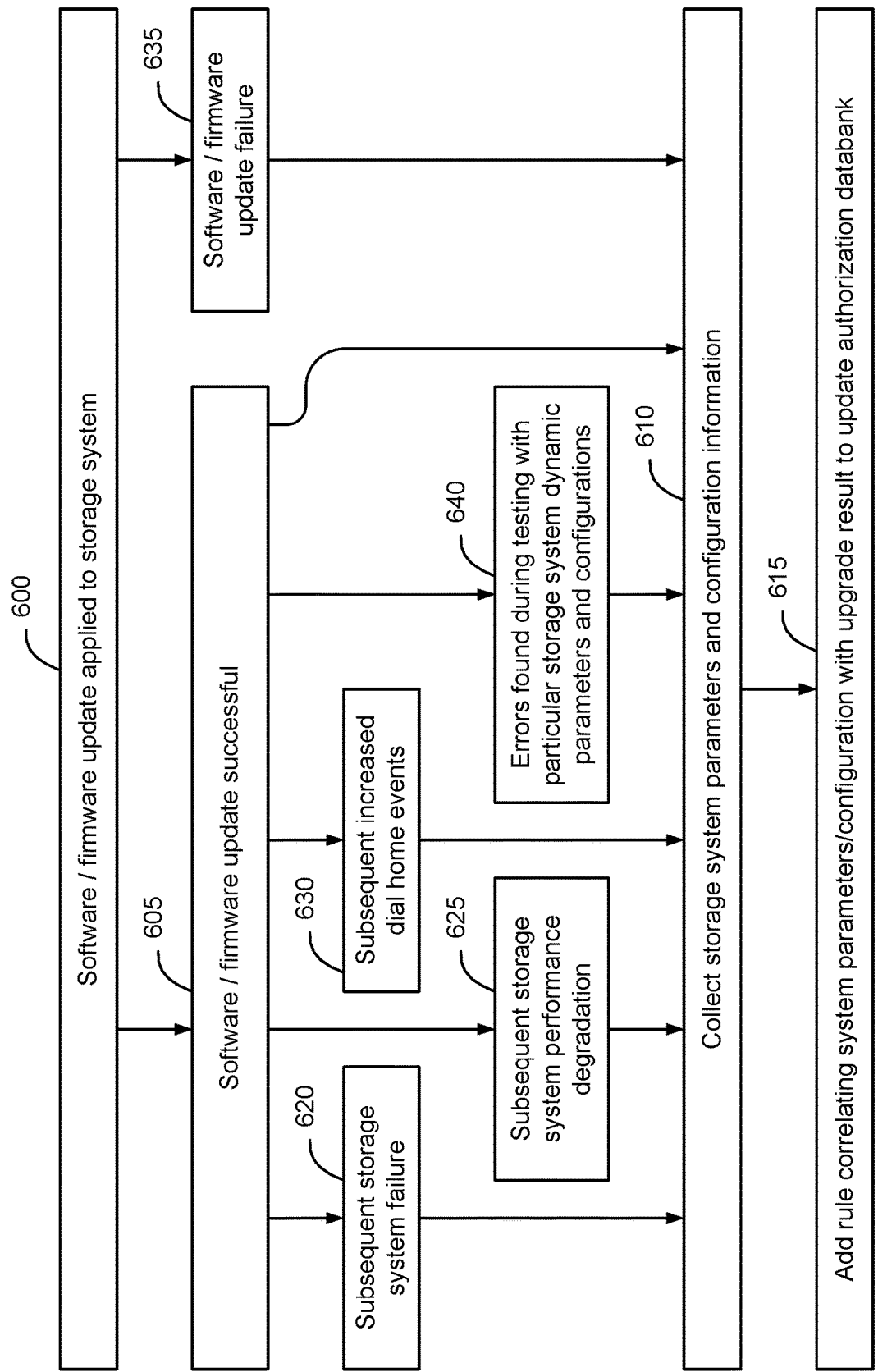
FIG. 6 is flowchart of a method of creating rules for inclusion in an update compatibility databank for use with the online system for update compatibility verification prior to update implementation, according to some embodiments.

FIG. 6 is flowchart of a method of creating rules for inclusion in an update compatibility databank 265 for use with the online system for update compatibility verification prior to update implementation, according to some embodiments. There are instances where an update is applied to a storage system, and after the update is applied, the storage system starts to exhibit symptoms indicating that perhaps the update is incompatible with the particular storage system configuration, or that remedial (preparatory) actions should have been implemented prior to applying the update to the storage system. By collecting this type of information into the update compatibility verification system 255, it is possible to keep the update compatibility databank 265 current by continuously updating the update compatibility databank 265 as storage system configurations are identified that are not compatible with particular updates.

For example, as shown in FIG. 6, when a software/firmware/hardware update is applied to a storage system (block 600), the update procedure may have a distribution of possible outcomes. One update outcome is that the update is successful (block 605). Another possible outcome is that the update is not successful (block 635).

In some embodiments, if the update is successful (block 600) the successful update is communicated to the update compatibility verification system 255, which collects the storage system configuration information, if that information was not previously retained by the update compatibility verification system 255 (block 610). The update compatibility verification system 255 then adds a rule correlating the storage system configuration information with the update result (success) to the update compatibility databank 265.

After successfully applying the update to the storage system, it is possible that the storage system might subsequently have performance issues that could possibly be correlated to the update. For example, in some instances the storage system might experience a storage system failure (block 620), subsequent storage system performance degradation (block 625), subsequent increase in the number of dial-home events (block 630), or subsequent testing might identify an incompatibility between the update and particular aspects of the storage system dynamic configuration (block 640). In each of these instances, the storage system configuration information of the storage system that were present when the update was applied to the storage system, and the update that was applied to the storage system, are correlated with the subsequent storage system failure, increased dial-home events, or performance degradation. The correlation is applied to the learning process 260, and if sufficient storage systems with similar storage system configurations report similar post-update negative symptoms, a rule will be added to the update compatibility databank 265 correlating the system configuration information with the update result, so that the update will be reported back as not being compatible with subsequent storage systems having similar storage system configurations. The engineering team can also specify remediation steps (preparatory actions) that should be taken prior to application of the update.

As shown in FIG. 6, another outcome of a software update (block 600) is that the update was not successful (block 635). There may be instances where an update, that is determined to not be indicated as incompatible by the update compatibility verification system 255, is applied to the storage system and is not successful (block 635). In some embodiments, when this occurs, the storage system configurations are collected (block 610) and a rule is added to the update compatibility databank 265 (block 615) that the update should be indicated to be incompatible with the particular storage system configuration. In this manner it is possible to prevent the update from being subsequently applied to similarly configured storage systems. For example, in some embodiments an escalation process is used to engage higher levels of an engineering team through the customer and product support teams when issues occur, to root cause the issue, identify actions to be taken (both remedial and preventative), that are recommended for specific systems also that are based on learning from past updates and their outcomes. This process then leads to the generation of new rules, which are added to the databank by the engineering organization upon review.

As shown in FIG. 6, another outcome of a software update (block 600) is that the update was successful, the update was tested (block 640), and that errors were found to due to the storage system having particular dynamic storage system configuration parameters (user settings) (block 640). There may be thousands of settings a user can adjust on a storage system to cause the storage system to behave in particular ways. Depending on the configuration of the storage system, a particular update might be found to cause the storage system to execute in an unanticipated manner, which can result in the occurrence of errors (block 640). In some embodiments, the dynamic configuration parameters and the storage system configuration information are collected (block 610) and used to create a rule (block 615) identifying the dynamic configuration parameters that can cause a storage system to be incompatible with a particular update. The engineering team can also specify remediation steps (preparatory actions) that should be taken prior to application of the update.

By providing a centralized on-line system that is able to be updated as known system configurations are determined to be incompatible with particular updates, it is possible to prevent updates from occurring on storage systems having particular storage system configurations. When a person connects their laptop to a storage system to be updated, the proposed update is communicated to the storage system. The storage system dials home to the cloud-based update compatibility verification system 255 to determine if this particular update is allowed on this particular system.

As described in greater detail, in some embodiments some of the information about the storage system is communicated to the update compatibility verification system 255 in advance—example information includes static information such as the number of storage engines, amount of memory, firmware version, previous software version, bug fixes, and other aspects describing the storage system that is static about the storage system. Some storage system information is dynamic, such as current configuration information, device state, etc. In some embodiments, the dynamic information is not communicated in advance, but rather is communicated in real time when the update is started.

The cloud-based update compatibility verification system 255 implements a learning process 260 that learns a correlation between system configuration, dynamic parameters, and update failures. The cloud-based update compatibility verification system 255 also includes rules, which may originate from many sources. For example, an engineering team can determine from testing an update that the update works on storage systems with particular storage system configurations, but should not be used for example on certain older storage systems that have different storage system configurations. The engineering team can also specify remediation steps (preparatory actions) that should be taken prior to application of the update.

In some instances, a particular update will be pushed out to a large number of storage systems at once, but each storage system will apply the update at a different time, depending on when it is convenient to schedule an update window. Since particular updates might require the storage system to be taken offline, application of the update to a group of storage systems might occur over multiple days or weeks. As the update is applied to storage systems with different storage system configurations, in some embodiments any update failures are provided as feedback to the update compatibility verification system 255. Subsequently, if a storage system with similar storage system configuration is scheduled to implement the update, when the storage system seeks authorization to apply the update, the cloud-based update compatibility verification system 255 can respond that the update has been identified as being incompatible with storage systems having the particular storage system configurations, thus obviating the need to take the storage system offline to apply the update until remediation measures (preparatory actions) are able to be determined and applied to the storage system. By requiring the update script to contact the update compatibility verification system 255 when the update script starts, but prior to applying the update to the storage system, it is possible to verify that the update is still recommended on this hardware/software and based on the dynamic configuration information before causing the storage system to be taken offline for application of the update.

According to some embodiments, a process step is included in any script, change or process where the update manager 200 will communicate home to the update compatibility verification system 255, and a series of instantaneous checks are performed to verify that the planned change (update) is permitted to proceed. Storage system configuration information is communicated home such as the existing system configuration file (bin) and its new configuration file (bin), current code level and future planned target code level (code fixes being added and code fixes being removed), and the current configured hardware in the system (drive, board, and component types etc.). The system also communicates home the exact change type that is planned and, in some embodiments, an update identifier code is used for this.

In some embodiments, the communication home process step establishes if, based on current up to date real time rules, if any element of the change is disallowed such as, for instance, a newly disallowed fix etc. being loaded or a newly disallowed low firmware level. By requiring that compatibility of the update be verified in real time, just prior to application of the update to the storage system, it is possible to prevent cascading failures from occurring in the field, that might otherwise require customer support to be engaged, and make it possible to prevent serious issues form occurring by stopping application of updates that have been identified as being unsafe on particular storage system configurations. The activity can be any kind of change be it an online update, code load, firmware update, engine add or other field replacement unit (FRU) replacement. By implementing a dial-home step in advance of application of an update, and in connection with initiating application of an update, it is possible to prevent issues from occurring in the field that are mitigatable and avoidable.

In some embodiments, dial-home information from systems after the update activity are also be analyzed to identify if the update activity subsequently caused any issues for specific configurations or system types or specific systems with specific hardware or software components. Increased dial-home events, serious issues, and escalations, post update activity, are flagged, and upon engineering direction, rules used in this process step may get updated for systems with specific hardware or software configurations and suggested actions that should be taken on storage systems that received this particular update and are experiencing these systems may also populated in the update compatibility databank 265 for when this specific check condition is encountered.

In some embodiments, the update script 210 causes the storage system to communicate home at the end of the update activity and reports the health of the storage system after the update activity and how long the update activity took on this storage system, whether there were any error messages, if support was required to be engaged, whether there was any customer impact etc. Optionally, a short survey may be included at the end of the script. In some embodiments, if customer support is required to be consulted in connection with application of a particular update, or if an knowledge base article was required to be consulted in connection with application of a particular update, the step of the script where this occurred may be logged in the internal data structures of the script 210 and communicated home at the end of the update script 210, for use to modify the update script used in connection with subsequent applications of the same update. Rules and directives would then be updated for this activity where these system configurations are present.

In some embodiments, a supervised learning algorithm model can be used to implement the update compatibility verification system 255, and logistic regression used to predict if the planned activity should be allowed or blocked.

In some embodiments, the script includes a requirement for the field team and/or support to quickly complete a post update/activity health status report for the storage system immediately after the update activity is completed, and again at a later point in time, such as one month after the update activity. In some embodiments, the storage system or headquarters generates a dial-home service request in instances where the follow-up health status report is not provided, for example to indicate that this has yet to be completed for the system after the update activity. The results of these health check reports, in some embodiments, are used to determine the overall success or otherwise of this update activity for specific storage system types with particular storage system configurations, and in some embodiments the rules of the update compatibility databank 265 are automatically changed or suggested rule changes are created and flagged for inclusion in the update compatibility databank 265.

In some embodiments, rather than communicating home all the information regarding the system's current hardware and software configuration during the update activity, this could already be known and collected by the update compatibility verification system from the storage system previously, and updated in the update compatibility verification system 255 either periodically or whenever a change is made to the hardware, firmware, or software of the storage system. For example, a hash code and timestamp stored on the storage system and at update compatibility verification system 255 could then be used to verify the storage system configuration have not changed when the script initiates the verification process to determine, via the on-line update compatibility verification system 255, whether it is OK to proceed with the update on the storage system. By communicating the storage system configuration to the update compatibility verification system 255 in advance, it is possible to reduce the amount of time it takes to implement the update on the storage system. In addition, by having the storage system configuration stored in the update compatibility verification system 255, it is possible to centrally evaluate whether it is possible to apply a particular update to a particular storage system without accessing the storage system in the field. By enabling a check to be implemented on-line prior to attending the site where the storage system is located, and during the planning stages for the update activity, it is possible to identify and implement any remedial (preparatory) actions required prior to the update activity.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of selective application of an update by an update script to operational systems of a storage system, comprising:

providing an instruction to the storage system to start execution of the update script on the storage system, the update script having an update identifier and being configured to manage a process of installing the update to the operational systems of the storage system, the update script being further configured to implement update compatibility verification prior to update implementation, the update comprising a hardware update, a firmware update, a software update, or a combination of hardware, firmware and software updates;

in response to receipt of the instruction, starting the execution of the update script by the storage system, wherein the execution of the update script comprises, prior to installation of the update to the operational systems of the storage system:

collecting complete storage system configuration information from the storage system by the executing update script, the complete storage system configuration information including storage system type information, storage system hardware information identifying hardware components of the storage system, storage system firmware information identifying a respective firmware version that is currently installed on each of the hardware components that require the use of firmware, storage system software information identifying all current software that has been installed on the storage system, as well as patches and bug fixes that have been applied to the current software, and storage system dynamic configuration information describing aspects of the storage system that have been administratively set on the storage system;

transmitting the update identifier of the update to be applied and the complete storage system configuration information from the storage system to an update compatibility verification system over a computer network, the update compatibility verification system including an update compatibility databank that is updated in real time based on update operations on other storage systems and containing entries correlating update identifiers with aspects of known incompatible storage system configurations;

determining a subset of the entries associated with the update identifier of the update script by the update compatibility verification system, each entry of the subset of entries having a respective correlated aspect of the known incompatible storage system configurations;

comparing the complete storage system configuration information by the update compatibility verification system with the correlated aspects of the known incompatible storage system configurations of each of the subset of entries, to determine if the update is incompatible with the complete storage system configuration information; and transmitting a response containing a compatibility verification determination by the update compatibility verification system to the update script on the computer network, the compatibility verification determination specifying either that the update is not indicated to be incompatible with the storage system, or that the update is not compatible with the storage system;

in response to receipt by the update script of the compatibility verification a determination specifying that the update is not indicated to be incompatible with the storage system, automatically continuing execution of the update script on the storage system to install the update to the operational systems of the storage system by the update script; and in response to receipt by the update script of the compatibility verification a determination specifying that the update is not compatible with the storage system, stopping execution of the update script on the storage system to prevent the update from being installed to the operational systems of the storage system to protect the storage system from being updated in instances where the update is determined to be not compatible with the storage system based on the complete storage system configuration information.

2. The method of claim 1, wherein communicating the storage system configuration information to the update compatibility verification system comprises querying the update compatibility verification system for the compatibility verification determination.

3. The method of claim 1, wherein the update compatibility verification system is a centralized online system connected to the computer network.

4. The method of claim 1, wherein, in response to the determination that the update is not compatible with the storage system configuration, the method further comprises identifying preparatory actions to be implemented on the storage system to change the configuration of the storage system such that the update will be compatible with the changed configuration of the storage system.

5. The method of claim 1, in response to the determination that the update is not indicated to be incompatible with the storage system configuration, the method further comprising determining a result of applying the update by the update script to the operational systems of the storage system.

6. The method of claim 5, in response to a determination that the result was a failure, the method further comprises generating a rule to be applied by the update compatibility verification system identifying the update as being not compatible with the storage system configuration.

7. The method of claim 6, wherein determining the result of applying the update is implemented contemporaneously with applying the update to the storage system.

8. The method of claim 6, wherein determining the result of applying the update is implemented over a subsequent time interval after applying the update to the storage system.

9. The method of claim 8, wherein determining the result of applying the update comprises determining an increased number of storage system failures during the subsequent time interval after applying the update to the storage system.

10. The method of claim 8, wherein determining the result of applying the update comprises determining an increased number of dial-home service requests by the storage system during the subsequent time interval after applying the update to the storage system.

11. The method of claim 8, wherein determining the result of applying the update comprises determining a degraded performance by the storage system during the subsequent time interval after applying the update to the storage system.

* * * * *